Patented Apr. 3, 1928.

1,664,815

UNITED STATES PATENT OFFICE.

HUGO GRONROOS, OF COPENHAGEN, DENMARK.

PROCESS FOR THE MANUFACTURE OF BURNT BUILDING MATERIALS OR THE LIKE OF CLAY.

No Drawing. Application filed August 4, 1925, Serial No. 48,054, and in Denmark August 6, 1924.

The present invention relates to a process for the manufacture of burnt building materials and the like of clay, whereby it becomes practicable to effect kiln drying, burning and cooling of the moulded units immediately after moulding and pressing as one continuous process during the course of a few hours, so that the lengthy air drying of the moulded units and the slow burning and cooling may be avoided which are otherwise necessary in the production of burnt building materials and the like of clay, in order to avoid that the moulded units crack or crumble during the kiln drying and burning, or crack during the cooling.

According to the invention a more or less finely granular burnt material referred to in the following as the burnt material is first prepared from the clay to be used for the moulded units. If this clay is of such a nature that it fuses or sinters at a relatively low temperature, it may be used for production of the burnt material without the addition of any kind of chemical substances. If on the contrary the clay is of such a nature that it does not fuse or sinter until exposed to a relatively high temperature, addition is made partly of substances such as cryolite or other compounds of sodium or potassium, most suitably as the said substances occur in nature, partly of iron oxide. The object of adding these substances is to bring the clay into such a state that when to be used as burnt material it may be burnt, fused or sintered at a relatively low temperature.

According to the invention, the main features of the invention are first to prepare the above mentioned granular burnt material, that is to say either without or with addition of the said chemical substances, and then to use this burnt material as an admixture to the clay from which the moulded units of the concerned building material or the like are to be formed.

If chemical substances are added to the clay, there may be used for instance 200 kilos of pulverized clay, 100 kilos of pulverized cryolite, most suitably annealed previously in a furnace at a temperature of 600 to 700° C., 10 kilos of iron oxide and 400 kilos of water.

This liquid mass is then mixed with clay in the proportion of 10 kilos of the mixture to 1000 kilos of raw clay. The mixture is effected by intense kneading so that the addition will be well distributed into the clay mass. If the latter is especially moist, the percentage of water in the admixed mass to be added may be reduced or omitted entirely, in order that the mass produced may acquire a consistency suitable for moulding.

The mass thus produced is treated in the manner commonly known from the manufacture of bricks, the mass passing through a pebble removing device and a fine-rolling device to a worm press from which latter it is directed out in the shape of a bar which on a cutting table is cut into blocks of suitable size, which blocks are then piled on to cars and directed into a tunnel-kiln for annealing or burning. The mass, however, may also be passed from the rolling mill directly into a rotary annealing kiln or the like, either in shape of lumps or as a liquid paste. The burning is performed at about 800° C.

The burnt blocks are then crushed so as to form a more or less granular material, which is used as admixture to the mass of clay from which the final moulded units are to be formed.

The quantity of the granular material added may differ according to the nature of the clay material, so that a smaller quantity of admixing material of higher fineness may be used for meagre clay, while in case of rich clay the admixed material may be larger in quantity and more coarsely grained.

The quantity of the admixed granular material may for instance be 50 parts by weight to 50 parts by weight of clay. The admixed material and the clay are first fed into a mixing machine and are treated there in such a manner that a coating of clay is formed on the grains. The moisture of the clay is absorbed by the granular material, in such a manner that the mixture remains granular but has a tendency to stick together. From the mixing machine the mixture passes to a crushing mill or rolling mill in which the mixture is rolled in such a manner that larger lumps are avoided, and the two different materials become firmly compressed. The mixture is then treated further in a crushing and stirring apparatus in which it is further subdivided and uniformly mixed, so that it will be suited for pressing, which is performed in a revolving press, or as a wet mixture in a worm press which presses are fed automatically, the mixture being directed to the press from a silo or the like. Moulded units for roofing tiles or other thin objects are produced from a wet mixture. In the press the mass is moulded into the shape of the units to be produced, and after moulding and pressing the units are piled on to cars which successively are entered into a tunnel-kiln for annealing or burning. The end of this kiln which is nearest to the supply end serves as drying zone in which the moulded units gradually as they pass along are exposed to increasing temperature, until they reach the burning zone, which is situated at the central portion of the kiln. The portion of the kiln farthest away from the supply end forms a cooling zone from which the cars with the finished moulded units are gradually removed.

The period during which the moulded units are treated in the kiln may suitably be eight hours, and if the kiln is arranged in such a manner that there is room for twenty-four consecutive cars, one car may thus be inserted every twenty minutes. The temperature at which the burning proper is performed is suitably 900° C.

When after burning the moulded units are cooled, they are at once ready for use.

Drying of the moulded units in the kiln proper immediately after moulding and pressing and the immediately subsequent burning and cooling are rendered practicable by use of the granular material which is porous, so that all through the moulded units there is produced a very large number of fine pores by way of which the steam generated by the drying may escape, and during the drying proper the admixed material has a highly assisting effect on the burning or sintering of the moulded units, and the finished burnt ware will also be able to stand quick cooling. Neither during drying, burning nor cooling will cracks occur in the moulded units, as shrinkage during drying and cooling as well as expansion during burning of the mass from which the moulded units are produced will be very slight, and will not exceed one-half percent.

Having thus described my invention, what I claim is:—

1. Process for the production of burnt building materials of clay, comprising the steps of preparing a granular annealed material from an admixture of clay and chemical substances adapted to lower the fusing point of the clay, admixing a quantity of said granular annealed material with the clay from which the actual moulded units for the building material are produced, moulding and pressing said units, and drying, burning and cooling the same in a kiln in one continuous operation.

2. Process for the production of burnt building materials of clay comprising the preparation of moulded units from raw clay, chemical substances adapted to lower the fusing point of clay and water, exposing said units to kiln drying, annealing and cooling, crushing the burned units into a granular material, kneading said granular material into the clay from which the final moulded units are to be produced, moulding and pressing said final units and drying, burning and cooling the same in a kiln, in one continuous operation.

3. Process for the production of burnt building materials of clay comprising the steps of admixing 200 kilos of powdered clay, about 100 kilos of powdered annealed cryolite and about 10 kilos of iron oxide, admixing with said mass clay in the proportions of 100 kilos of clay to 1 kilo of the mass, moulding the mass into units, subjecting said units to kiln drying, annealing and cooling, thereafter granulating said units and adding to the mass clay in equal proportions, mixing, rolling and crushing and remixing, re-rolling and re-crushing said mass, moulding the mass into units and subjecting said units to drying, annealing and cooling.

4. Process for the production of burnt building materials of clay, as set forth in claim 3, in which the last mentioned units are dried, annealed and cooled as one continuous operation over a period of approximately eight hours, the drying occurring in the front portion of the kiln, the annealing in the central portion at an approximate temperature of 900° C., and the cooling in the rear portion.

In testimony whereof I have signed my name to this specification.

HUGO GRONROOS.